Aug. 12, 1941.  E. B. ARCHER  2,252,540
CRACK CUTTER
Filed May 22, 1939

INVENTOR
ERLING B. ARCHER
By Geo. H. Mortimer
ATTORNEY

Patented Aug. 12, 1941

2,252,540

UNITED STATES PATENT OFFICE 2,252,540

CRACK CUTTER

Erling B. Archer, Flushing, N. Y.

Application May 22, 1939, Serial No. 274,955

6 Claims. (Cl. 30—171)

The present invention relates to a tool, and more particularly to a crack cutter including a sharpened blade, a handle and means pivoted to the handle removably to hold the blade in the handle.

In redecorating plastered surfaces it is often found that the plaster has cracked more or less severely. If such a surface is repainted or repapered without repairing the crack, the work is unsatisfactory because the crack cannot be concealed by paint and the paper soon ruptures derectly over the crack in the plaster. Proper repair of plaster cracks requires the removal of considerable plaster at the sides of the cracks so as to provide a groove large enough to be readily filled with repair plaster, such as plaster of Paris mixtures, for example. After the cracks have thus been cleaned and properly refilled to the plane of the surrounding plaster, the surface may be painted so that the crack is no longer visible, or if the surface is papered the paper does not rupture over the repaired places.

The removal of the plaster from the sides of cracks therein is usually accomplished by using a tool consisting of a steel blade and a handle in which it is permanently fastened. The blade has a sharpened point which is employed to cut or wear away the plaster adjacent to the crack. Plaster being a very abrasive substance, the blades wear out relatively quickly and the whole tool must then be thrown away.

I have invented a crack cutter comprising a handle and a blade removably secured in the handle, the blade being made of a simple stamping that can be produced for a very low price and cheaply replaced when it is worn out.

It is an object of my invention to provide a tool having a blade with a sharpened end suitable for cutting cracks in plaster and a handle in which the blade is removably held.

It is another object of my invention to provide a handle for a cutting blade provided with means to engage a portion of the blade to hold it in place in the handle during use.

A further object of the present invention is the provision of an inexpensive handle having a U-shaped bail pivoted thereto, the bail being capable of engaging under a struck out lug on a blade insertable into a slot in the handle removably to hold the blade in the slot.

Other objects and advantages of the present invention will become apparent from the following description of a preferred embodiment of my invention, taken in conjunction with the accompanying drawing, in which.

Figures 1, 2:
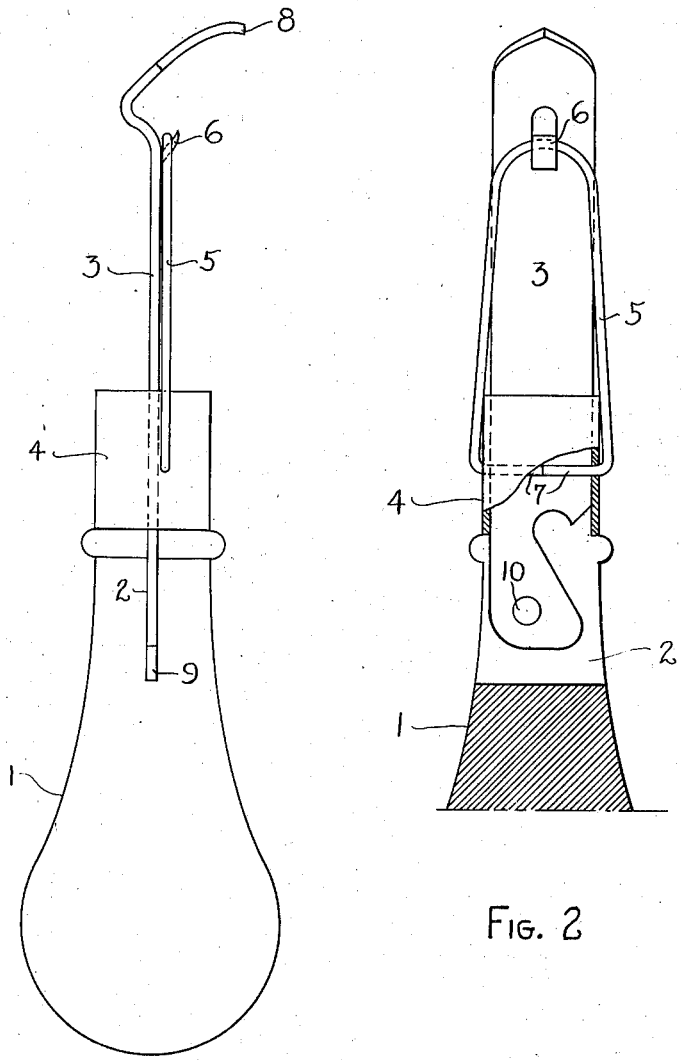
Fig. 1 is a side view of an embodiment of my invention.
Fig. 2 is a fragmentary view at right angles to Fig. 1 with certain parts in section.

Referring now more particularly to the drawing, reference character 1 represents a handle having a slot 2 in one end thereof adapted to receive an end of a blade 3. The handle 1 may be made of any suitable material, such as wood, metal, plastics of the thermoplastic types, etc. In the drawing I have illustrated a handle somewhat enlarged at the end remote from the blade, but it is apparent that the handle may have any desired shape. Preferably the handle is of a size capable of being comfortably held in one hand of the user. Surrounding and reinforcing the slotted end of the handle is a ferrule 4 having an internal dimension substantially identical with the width of the blade 3 while the slot 2 corresponds with its thickness. The end of the blade 3 thus substantially corresponds with the internal dimensions of the slot and is tightly engaged on all four sides, leaving the blade free for movement only axially of the handle. If the handle is made of metal it is obvious that the ferrule 4 may be made integral with the handle proper instead of a separate part as is preferable when wood or plastic is employed.

In order to prevent the blade 3 from pulling out of the slot 2 during use, I have provided a U-shaped bail 5 pivoted to the handle 1 and having its bight portion engageable with a lug or projection 6 struck out from the blade 3. Preferably the bail 5 is pivoted to the handle 1 through holes in the ferrule 4, and the ends 7 thereof may extend into bores in the handle 1 to assist in holding the ferrule 4 in place on the handle, as shown in Fig. 2. Other means, such as a pin, indentations, etc., may also be used alone or in combination to hold the ferrule firmly on the handle. The free end of the blade 3 is sharpened and curved as shown at 8 to form a V-shaped cutting edge. The slot 2 is deep enough to permit the blade 3 to be pushed inwardly sufficiently far to allow the bight portion of the bail 5 to swing past the end of the projection 6 when inserting or removing the blade. In normal position of the parts, as shown in Fig. 1, this leaves a space 9 between the end of the slot and the end of the blade. If desired this space 9 may be filled with some resilient material such as rubber to assist in holding the blade 3 in engagement with the bail 5, but ordinarily I prefer to have the blade fit so tightly in the slot that the frictional force alone suffices to retain the parts in the position shown unless a positive force is applied to the blade forcing it toward the end of the slot in order to free the bail and permit subsequent removal from the handle.

The blade 3 is preferably made of steel. In the form shown in the drawing, the blade is of such shape that it may be readily stamped out of sheet metal stock at very low cost. In fact, a blade of this type is obtainable on the market either free or for an extremely low price as a beer can opener manufactured under U. S. Patent No. 1,996,550, and it is a particular advantage of the preferred embodiment of my invention that these can openers may be used in the form available commercially. It is customary for merchants to give these openers away free when cans of beer or other liquids are sold, and instead of throwing them away after they have been used for this purpose, my invention provides a means of putting them to useful service. The slot 2, ferrule 4 and bail 5, in the preferred embodiment of my invention, are so dimensioned as to accommodate the commercially available can openers. While I prefer to secure the can openers 3 in the handle by the use of a bail or equivalent means pivoted to the handle to interlock with the lug 6, which is provided on the can opener to engage under the bead at the periphery of the can ends, it is within the contemplation of my invention to use any other suitable means for this purpose, e. g., a bolt extending through opening 10. It will be understood, of course, that I may provide blades 3 of better steel than is commonly used in making can openers, and that where blades are manufactured especially for this purpose other expedients for securing them in handles may be employed. Thus, instead of using a projection 6, the blade 3 may be made with an aperture or with shoulders engageable by retaining means secured to the handle. In general, however, I prefer to construct the handle so that the can openers may be used as previously described as this not only conserves materials which would otherwise be thrown away, but it also enables a painter or other user of crack cutters to replace worn blades at no cost, or at most at very nominal cost.

Although I have described my invention as a crack cutter, it will be obvious that it may be used for other purposes such as removing putty from a sash when the window pane is broken, scraping paint or dirt from floors adjacent to base boards, etc., etc. Similarly modifications and variations in the details of construction, as indicated above, may be made without departing from the spirit and scope of the present invention.

I claim:

1. A tool comprising a handle having a slot in one end thereof, a blade having one end inserted in said slot, said blade having a struck out lug in the portion thereof lying outside said slot, and a bail pivoted to said handle at the free ends thereof with the bight engaging said lug and retaining the blade in the slot of the handle against pulling forces.

2. A crack cutter comprising a wooden handle having a portion adapted to be grasped by one hand of the user, one end of said handle having a slot therein, a ferrule surrounding and reinforcing said end and forming side walls for said slot, a blade having one end inserted into said slot, said end of the blade substantially corresponding in size to the internal dimensions of the slot, said blade being sharpened at the other end and bent at an angle to the blade to form a substantially V-shaped cutting edge, a lug struck out from said blade, and a bail pivoted to said ferrule at its ends and having the bight engaging under said lug to retain the blade in the slot.

3. A crack cutter as set forth in claim 2 in which the ends of the bail extend into bores in the handle and assist in retaining the ferrule in position on the end of the handle.

4. A handle for a crack cutter adapted to be held in one hand of the user, said handle comprising an enlarged end and a slotted end, a ferrule surrounding and reinforcing said slotted end, a bail pivoted to said ferrule at its ends, and means for retaining said ferrule on said slotted end of the handle.

5. A handle for a crack cutter adapted to be held in one hand of the user, said handle having a slot in one end thereof adapted tightly to engage one end of a blade, a ferrule surrounding and reinforcing said slotted end, and a bail pivoted to said ferrule at its ends and having the proper length to engage a projection on the blade removably to retain the same in the handle.

6. A crack cutter comprising a handle having a slot in one end thereof, a blade having one end inserted in said slot, the other end of said blade being bent at an angle to the blade and sharpened to a substantially V-shaped cutting edge, a lug on the exposed part of said blade, and means pivoted to said handle having a portion engageable with said lug removably to retain the blade in the slot.

ERLING B. ARCHER.